Patented July 3, 1934

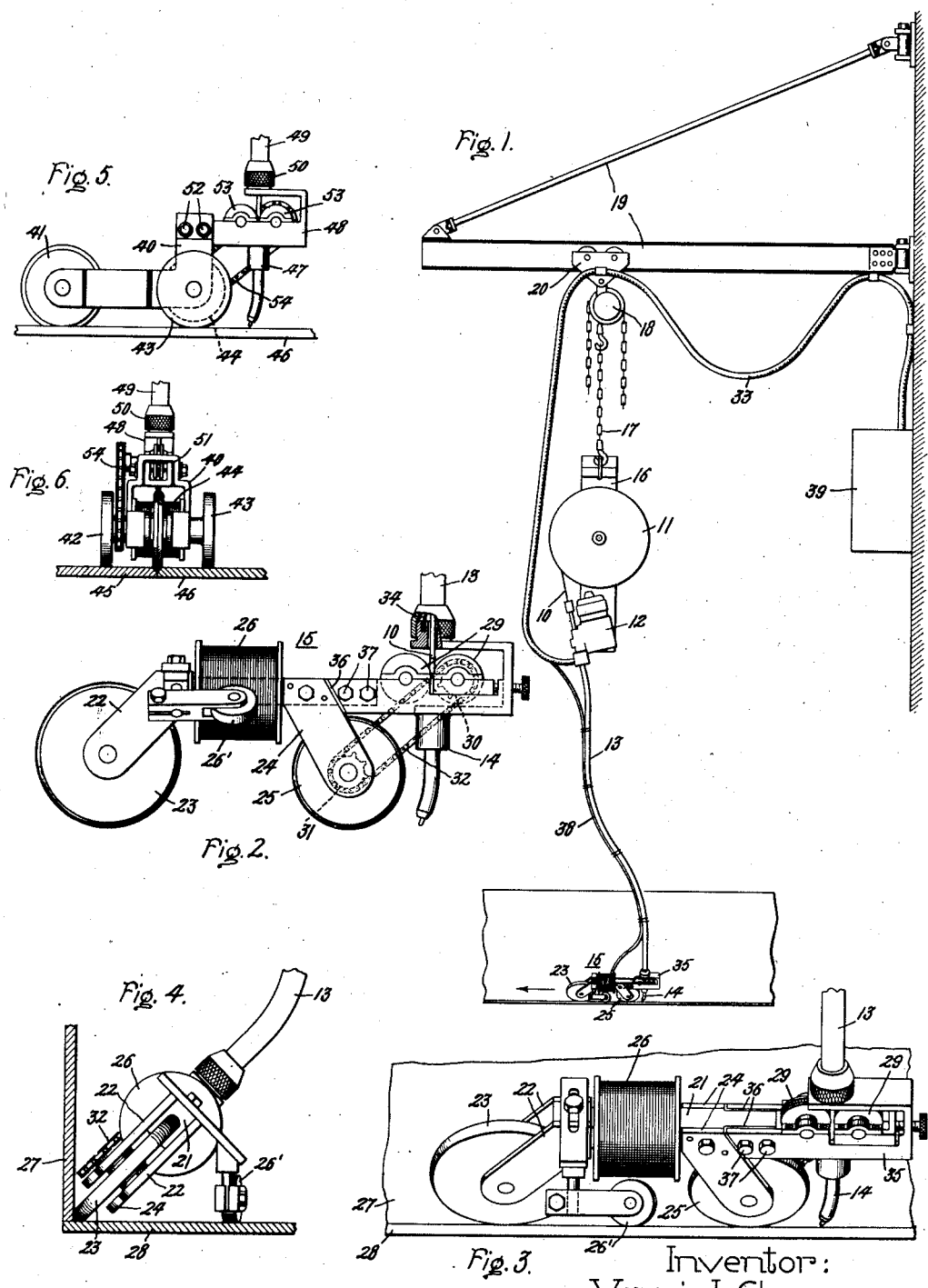

1,965,331

UNITED STATES PATENT OFFICE 1,965,331

ARC WELDING APPARATUS

Verni J. Chapman, Schenectady, N. Y., assignor to General Electric Company, a corporation of New York Application July 1, 1933, Serial No. 678,645

3 Claims. (Cl. 219—8)

My invention relates to electric welding of the type known as metallic arc welding wherein the welding arc is maintained between a fusible electrode and the work toward which it is continuously fed as it is consumed in the arc.

It is an object of my invention to provide an automatic arc welding machine in which a welding tool, adapted to be moved about the work independently of the position of the feeding means, is automatically propelled along the work by the welding electrode as it is fed toward the work.

My invention will be better understood from the following description taken in connection with the accompanying drawing in which Fig. 1 shows a side view of one embodiment thereof; Figs. 2, 3 and 4 show side and front views of the tool carriage forming part of the apparatus illustrated in Fig. 1, and Figs. 5 and 6 show side and front views of a modified form of tool carriage which may be employed.

In the apparatus illustrated in Fig. 1 the welding electrode 10 is withdrawn from a reel 11 by a feeding means 12 and supplied through a flexible electrode guide 13 to a welding tool 14 supported on a carriage 15 which is adapted to engage the work to be welded. The reel 11 and feeding means 12 are supported in a frame 16 which is suspended by a chain 17 from a hoist block 18 forming part of a jib crane 19 to the trolley 20 of which the hoist block is attached. In this manner the welding head is suspended above the work in such manner that it may be easily moved both vertically and horizontally relatively to the work.

The tool carriage 15 is more fully illustrated in Figs. 2, 3 and 4. Referring to these figures it will be noted that it comprises a frame 21 the front part of which is forked to provide legs 22 for a supporting wheel 23 and the rear of which is provided with legs 24 for a supporting wheel 25. In order to hold the carriage firmly to the work the wheels and framework of the carriage are made of a magnetic material and the carriage is magnetized by a winding 26 which is connected to a suitable source of current. The carriage is stabilized by a third wheel 26' which may be suitably supported in the carriage to adapt it for welding a seam between angularly disposed objects 27 and 28 such as illustrated in Figs. 3 and 4.

The tool carriage 15 is propelled by a mechanism which engages and is driven by the electrode 10 as it is fed through the tool 14 toward the work. In the arrangement illustrated this mechanism comprises a plurality of rolls 29, one of which is connected by means of sprockets 30 and 31 and a chain 32 to supporting wheel 25 of the tool carriage 15. The rolls 29 may be geared together to transmit greater torque with less pressure between them as has already been proposed in electrode feeding devices. The rolls 29 may be adjusted relatively to one another to positively grip the electrode fed therebetween. Thus as the electrode is fed through the welding tool 14, the carriage 15 is propelled along the work by the electrode engaging means.

Welding current is supplied to the welding tool through a cable 33 and conductors 34 enclosed in flexible guide 13. Conductors 34 are electrically connected to a bracket 35 in which the welding tool 14 is supported. This bracket is electrically insulated from the frame of the tool carriage 15 by means of insulation 36 and insulating bushings provided between the bolts 37 and the frame 21 of the tool carriage. Either or both sprockets 30 and 31 are also electrically insulated from the frame of the tool carriage so that current cannot pass through the chain 32 to the work. Current for the magnetizing coil 26 is also supplied through cable 33 and conductors 38 attached to the electrode guide 13 as illustrated in Fig. 1.

The feeding means 12 is suitably controlled to feed the electrode toward and away from the work in accordance with a characteristic of the welding arc to maintain the arc length and voltage substantially constant during the welding operation. This controlling means may be enclosed within a receptacle 39 which is electrically connected to the feeding means 12 by conductors enclosed within the cable 33. Suitable control arrangements may be employed such as shown in United States Letters Patent No. 1,508,711, P. O. Noble, granted September 16, 1924, although it is to be understood that my invention is not limited to the employment of the particular arrangements illustrated in this patent. This patent also illustrates the constructions of flexible electrode guiding means and welding tools which may be used for the guiding means 13 and welding tool 14 of my invention.

The operation of the apparatus above described is as follows: The electrode 10 is fed through the guiding means 13 by the feeding means 12 to the welding tool 14. As has been pointed out above, the feeding means operates through suitable controlling means to feed the electrode toward and away from the work in accordance with a characteristic of the welding arc to strike and thereafter maintain a welding arc of substantially constant length and voltage. As the electrode is fed toward the work it is engaged by wheels 29 which are rotated and impart their rotation to one of the supporting wheels 25 of the tool carriage 15, by means of which it is propelled along the work. The carriage is held in engagement with the work by the magnetizing effect of the coil 26 and due to the flexible connection between the tool carriage and the electrode feeding means provided by the electrode guide 13 the welding tool is adapted to move about the work independently of the position of the feeding means. Thus, in welding angularly disposed objects such as illustrated in Figs. 1, 3 and 4, the carriage may be tilted as illustrated and held in this position by a proper adjustment of the third wheel 26 of the carriage. Then, as the welding operation proceeds the welding carriage will be propelled along the seam and produce a fillet weld between the angularly disposed objects independently of the supervision of the welding operator and without his assistance. As indicated in Fig. 1, the carriage precedes the tool in the direction of welding. This is not necessary, however, since by properly designing the tool carriage the opposite direction of travel may be provided.

In Figs. 5 and 6 I have shown a modified form of tool carriage adapted for welding flat work. The frame 40 of the carriage is formed of a U-shaped member having angularly disposed side bars which are inturned toward one another at the front of the machine to form a support for a guide roll 41. In the particular arrangement illustrated this guide roll is shown as provided with a V-shaped tread in order to adapt it for engaging a V-groove such as is often employed between work parts of substantial thickness in order to facilitate the welding operation. The driving wheels of the carriage 42 and 43 are supported on a common axle at the rear of the frame 40 which also provides a support for an electromagnet 44. The supporting wheels 42 and 43 and their axle upon which the magnetizing coil 44 is located are of magnetic material so that by exciting coil 44 a suitable magnetic effect may be produced for holding the carriage in firm engagement with the work parts 45 and 46. Welding tool 47 is supported on a bracket 48 to which the flexible guide 49 is connected by a coupling 50 in the same manner as illustrated in the carriage of Figs. 1 to 4, inclusive. The bracket 48 is electrically insulated from the tool carriage by insulation 51 and suitable insulating sleeves about bolts 52 by means of which it is attached to the carriage. The carriage is propelled through the agency of the electrode engaging rolls 53 one of which is connected through sprockets and a chain 54 to the axle of the driving wheels 42 and 43 of the carriage. Different sized rolls may be used for different sized electrodes or these rolls may be made adjustable relatively to one another as in the embodiment illustrated in Figs. 1 to 4. When welding with a carriage such as illustrated in Figs. 5 and 6 described above, it is placed in contact with the work at the seam with the guide wheel 41 in the groove between the parts and as the electrode is fed to the welding tool 47 by feeding means such as illustrated in Fig. 1, the carriage is propelled along the work in advance of the welding tool which is guided thereby along the seam being welded.

From the particular embodiments described above, it will be perfectly apparent that other arrangements may be employed in accordance with my invention without departing from the teachings thereof. The type and arrangement of parts employed in the tool carriage will of necessity depend upon the class of work to be welded and may assume many shapes and forms other than that employed in the two arrangements described above in explaining my invention. It is also perfectly apparent that various forms of guiding means may be employed for connecting the feeding means to the tool carriage. The arrangements illustrated and described may be variously modified without departing from the teachings of my invention, and I seek, therefore, in the appended claims to cover all modifications which fall within the true spirit and scope of my invention.

What I claim as new and desire to secure by Letters Patent of the United States is:

1. Welding apparatus comprising electrode feeding means, work engaging means, electrode guiding means for connecting said feeding means with said work engaging means, and means driven by said electrode for propelling said work engaging means along the work.

2. Welding apparatus comprising electrode feeding means, a welding tool, flexible means for guiding an electrode from said feeding means to said welding tool, a work engaging travel carriage for said tool, and means driven by said electrode for propelling said carriage along the work.

3. Welding apparatus comprising electrode feeding means, a welding tool adapted to be moved about the work independently of the position of said feeding means, means for guiding an electrode from said feeding means to said welding tool, means arranged to lead welding current into the electrode at said welding tool, a carriage for said welding tool and means driven by said electrode for propelling said carriage along the work.

VERNI J. CHAPMAN.